United States Patent
Sapozhnikov et al.

(10) Patent No.: US 9,343,091 B1
(45) Date of Patent: May 17, 2016

(54) SENSOR STRUCTURE HAVING LAYER WITH HIGH MAGNETIC MOMENT

(71) Applicant: Seagate Technology LLC, Cupertino, CA (US)

(72) Inventors: Victor Boris Sapozhnikov, Minnetonka, MN (US); Kevin McNeill, Derry (IE)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/018,365

(22) Filed: Feb. 8, 2016

Related U.S. Application Data

(62) Division of application No. 14/486,827, filed on Sep. 15, 2014, now Pat. No. 9,269,381.

(51) Int. Cl.
*G11B 5/39* (2006.01)

(52) U.S. Cl.
CPC .................................. *G11B 5/3912* (2013.01)

(58) Field of Classification Search
None
See application file for complete search history.

(56) References Cited

U.S. PATENT DOCUMENTS

| | | | |
|---|---|---|---|
| 5,812,350 A | 9/1998 | Chen et al. | |
| 6,025,978 A * | 2/2000 | Hoshi | G11B 5/3967 360/319 |
| 6,163,442 A | 12/2000 | Gill et al. | |
| 6,275,360 B1 * | 8/2001 | Nakamoto | G11B 5/11 360/317 |
| 6,342,311 B1 | 1/2002 | Inturi et al. | |
| 6,393,692 B1 * | 5/2002 | Ju | G11B 5/3912 29/603.14 |
| 8,400,738 B2 | 3/2013 | Covington et al. | |
| 8,582,238 B1 * | 11/2013 | Liu | G11B 5/1278 360/125.3 |
| 8,582,241 B1 | 11/2013 | Yu et al. | |
| 8,630,069 B1 * | 1/2014 | Okawa | G11B 5/3932 360/319 |
| 8,670,211 B1 | 3/2014 | Sun | |
| 8,711,525 B2 | 4/2014 | Singleton et al. | |
| 8,724,259 B1 * | 5/2014 | Liu | G11B 5/1278 360/125.15 |
| 8,810,964 B2 * | 8/2014 | Gao | G11B 5/1278 360/125.3 |
| 8,970,994 B2 | 3/2015 | Sapozhnikov et al. | |
| 8,988,832 B2 | 3/2015 | McNeill et al. | |
| 9,001,472 B2 | 4/2015 | Singleton et al. | |
| 9,053,720 B1 * | 6/2015 | Chye | G11B 5/3912 |
| 9,087,525 B2 | 7/2015 | Lu et al. | |
| 9,123,886 B2 * | 9/2015 | Zhang | H01L 43/12 |
| 9,153,251 B2 | 10/2015 | Sapozhnikov et al. | |
| 9,269,381 B1 * | 2/2016 | Sapozhnikov | G11B 5/3912 |
| 2003/0151849 A1 | 8/2003 | Sasaki et al. | |
| 2003/0151852 A1 | 8/2003 | Sasaki et al. | |
| 2008/0055787 A1 * | 3/2008 | Han | G11B 5/1272 360/319 |
| 2009/0279213 A1 | 11/2009 | Wu et al. | |
| 2012/0087046 A1 | 4/2012 | Yanagisawa et al. | |
| 2012/0327537 A1 | 12/2012 | Singleton et al. | |
| 2013/0293225 A1 | 11/2013 | Singleton et al. | |
| 2014/0268417 A1 | 9/2014 | Singleton et al. | |

* cited by examiner

*Primary Examiner* — Will J Klimowicz
(74) *Attorney, Agent, or Firm* — HolzerIPLaw, PC

(57) ABSTRACT

A reader sensor having a composite shield and a sensor stack. The composite shield includes a high magnetic moment layer having a magnetic moment greater than 1.0 T, a low magnetic moment layer, and a spacer therebetween. The high magnetic moment layer is closer to the stack than the low magnetic moment layer. The high magnetic moment layer may be a single layer or have a plurality of layers.

18 Claims, 9 Drawing Sheets

SENSOR STRUCTURE HAVING LAYER WITH HIGH MAGNETIC MOMENT

CROSS REFERENCE

This application is a divisional application of U.S. application Ser. No. 14/486,827, filed Sep. 15, 2014, now issued as U.S. Pat. No. 9,269,381, the entire disclosures of which are incorporated herein by reference.

BACKGROUND

In a magnetic data storage and retrieval system, a magnetic read/write head includes a reader portion having a magnetoresistive (MR) sensor for retrieving magnetically encoded information stored on a magnetic disc. Magnetic flux from the surface of the disc causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information to recover the information encoded on the disc.

SUMMARY

One particular implementation described herein is a reader sensor having a sensor stack and a composite shield. The composite shield includes a high magnetic moment (MINI) layer having a magnetic moment greater than 1.0 T, a low magnetic moment (LMM) layer, and a spacer therebetween, wherein the HMM layer is closer to the stack than the LMM layer.

Another particular implementation is a reader sensor having a top shield, a bottom shield, and a sensor stack between the top shield and to the bottom shield. At least one of the top shield and the bottom shield includes a reference layer having a high magnetic moment greater than 1.0 T, a pinned layer having a magnetic moment no greater than 1.0 T, and a spacer therebetween. The reference layer is closer to the stack than the pinned layer.

Yet another particular implementation is a reader sensor having a top shield, a bottom shield. and a sensor stack between the top shield and the bottom shield. One of the top shield or the bottom shield comprises a reference layer, a pinned layer, a spacer between the reference layer and the pinned layer, and a high magnetic moment (HMM) layer magnetically coupled to the reference layer. The HMM layer is closer to the one of the top shield or the bottom shield than the reference layer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

BRIEF DESCRIPTIONS OF THE DRAWING

The described technology is best understood from the following Detailed Description describing various implementations read in connection with the accompanying drawings.

DETAILED DESCRIPTION

Figure 1:
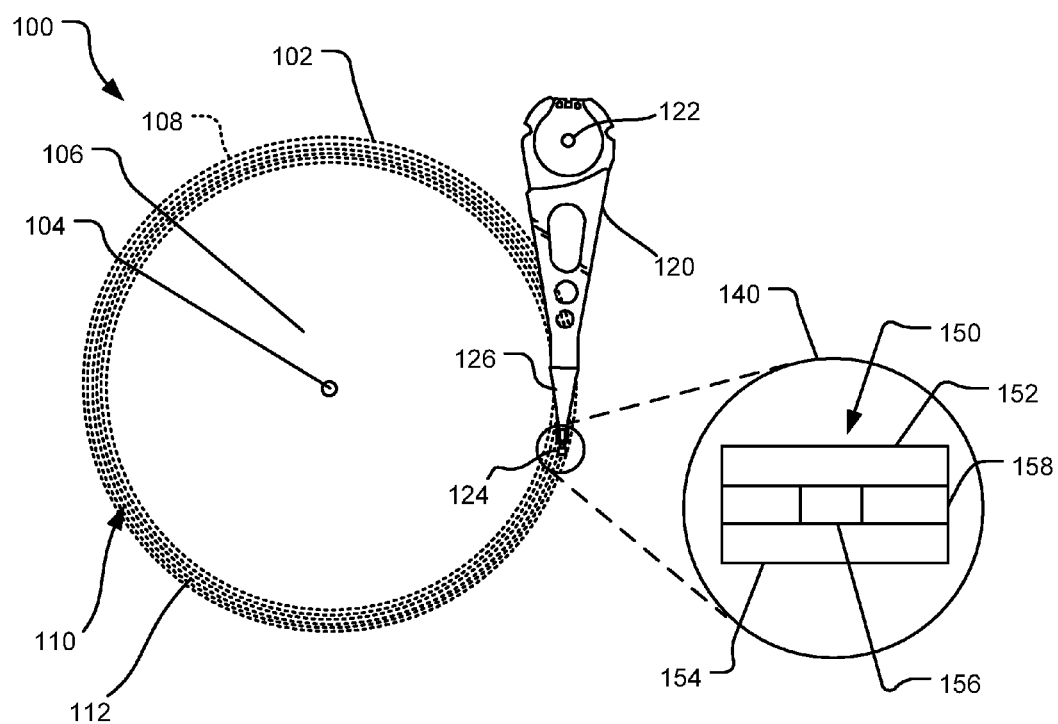
FIG. 1 is a perspective view of an example recording device using a reader having a sensor structure disclosed herein.

There is an increasing demand for high data densities and sensitive sensors to read data from a magnetic media. Giant Magnetoresistive (GMR) sensors that have increased sensitivity consist of two soft magnetic layers separated by a thin conductive, non-magnetic spacer layer such as copper. Tunnel Magnetoresistive (TMR) sensors provide an extension to GMR in which the electrons travel with their spins oriented perpendicularly to the layers across a thin insulating tunnel barrier. An antiferromagnetic (AFM) material (often called a "pinning layer") is placed adjacent to the first soft magnetic layer to prevent it from rotating. With its rotation inhibited, the first soft layer is termed the "pinned layer" (PL). AFM materials exhibiting this pinning property are termed "pinning materials". The second soft magnetic layer rotates freely in response to an external field and is called the "free layer" (FL).

To operate the MR sensor properly, the sensor is preferably stabilized against the formation of edge domains because domain wall motion results in electrical noise that makes data recovery difficult. A common way to achieve stabilization is with a permanent magnet abutted junction design. In this scheme, permanent magnets with high coercive field (i.e., hard magnets) are placed at each end of the sensor. The field from the permanent magnets stabilizes the sensor and prevents edge domain formation, as well as provides proper bias. In order to increase the stiffness of the PL, a synthetic antiferromagnetic (SAF) material is used in the PL. The use of the AFM/PL allows for consistent and predictable orientation of the SAF structure. Furthermore, the use of the AFM/PL also provides stable structure to enable high amplitude linear response for a reader using the MR sensor.

The assembly of the various layers the GMR/TMR sensors, as discussed above, is also referred to as a sensor stack. Such sensor stack may be surrounded by a bottom shield and a top shield to shield the sensor from any magnetic influences that are generated from other components of the transducer head; these shields can be referred to as bulk shields. In such an implementation, the distance between the top shield and the bottom shield is referred to as the shield-to-shield spacing (SSS). PW50, which is the pulse width of a magnetic element at 50% of the pulse amplitude, is indicative of the spatial resolution of the sensor. The pulse width PW50 of magnetic sensors, which determine the signal-to-noise (SNR) ratio in a recording system, depend on the SSS of the head. Specifically, a reduction in the SSS leads to reduction in the value of the PW50 and therefore, an increase in the value of the SNR for the recording system. However, using SSS reduction to achieve lower PW50 has its limits.

The PW50 performance of a shield can be improved by increasing its magnetic moment. However, higher-moment materials tend to have higher coercivity and magnetic non-uniformity, which creates shield instability and a decrease in the SNR. A top shield has two main functions: shielding for PW50 and MT metrics improvement, and support of the side shields. However, supporting the side shields precludes PW50 reduction by using thin layers decoupled from the bulk shields.

An example sensor assembly disclosed herein provides PW50 improvement while having shield material coercivity and magnetic non-uniformity significantly less than in a high-moment shield. Specifically an example sensor assembly disclosed herein provides alternative methods for reducing the PW50 of a sensor without reducing the SSS of the sensor and without increasing significantly the coercivity and magnetic non-uniformity of the shields. Specifically, the sensor assembly includes a reader sensor or "stack" surrounded by a bottom shield and a top shield in down-track direction, where one of the shields has a layer, magnetically coupled to the rest of the shield, having a high magnetic moment (higher than 1.0 T) close to the sensor stack. By providing a high magnetic moment material close to the sensor stack, the stability of the sensor is maintained, due to a small increase in coercivity and magnetic non-uniformity, if any, while the PW50 of the sensor stack is greatly decreased. The result is improved SNR of the recording system using such sensor assembly.

It is noted that the technology disclosed herein may be used in conjunction with a variety of different types of magnetic sensors (e.g., anisotropic magnetoresistive (AMR) sensors, TMR sensors, GMR sensors, etc.). Accordingly, the implementations discussed may also be applicable to new sensor designs that are based on new physical phenomena such as lateral spin valve (LSV), spin-hall effect (SHE), spin torque oscillation (STO), etc.

In the following description, reference is made to the accompanying drawing that forms a part hereof and in which are shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below. In some instances, a reference numeral may have an associated sub-label consisting of a lower-case letter to denote one of multiple similar components. When reference is made to a reference numeral without specification of a sub-label, the reference is intended to refer to all such multiple similar components.

FIG. 1 illustrates a perspective view of an example recording device 100 using a reader disclosed herein. Recording device 100 includes a disc 102, which rotates about a spindle center or a disc axis of rotation 104 during operation. The disc 102 includes an inner diameter 106 and an outer diameter 108 between which are a number of concentric data tracks 110, illustrated by circular dashed lines. The data tracks 110 are substantially circular and are made up of regularly spaced patterned bits 112, indicated as dots or ovals on the disc 102. It should be understood, however, that the described technology may be employed with other types of storage media, including continuous magnetic media, discrete track (DT) media, etc.

Information may be written to and read from the bits 112 on the disc 102 in different data tracks 110. A transducer head 124 is mounted on an actuator assembly 120 at an end distal to an actuator axis of rotation 122 and the transducer head 124 flies in close proximity above the surface of the disc 102 during disc operation. The actuator assembly 120 rotates during a seek operation about the actuator axis of rotation 122 positioned adjacent to the disc 102. The seek operation positions the transducer head 124 over a target data track of the data tracks 110.

An exploded view 140 illustrates an expanded view of the transducer head 124, with a reader sensor 150 illustrated by a schematic block diagram that illustrates an air-bearing surface (ABS) view of the reader sensor 150. In the illustrated implementation, the reader sensor 150 is illustrated to include a top shield 152 and a bottom shield 154, with a sensor stack 156 between the shields 152, 154 along the down-track direction of the reader 150. The top shield 152 and the bottom shield 154 protect the sensor stack 156 from flux from adjacent data tracks 110 on the disc 102. The details of which are not shown, sensor stack 156 includes multiple layers, including a free layer that has a switchable magnetic orientation. Also between the top shield 152 and the bottom shield 154, bounding the sensor stack 156 in the cross-track directions, are side shields 158. In accordance with this disclosure, at least one of the top shield 152 and the bottom shield 154 is a composite shield, that includes a high magnetic moment (HMM) material that has a magnetic moment greater than 1.0 T. In some implementations, the magnetic moment is at least 1.2 T, or at least 1.4 T, or at least 1.8 T, or even at least 2.4 T.

Figure 2:
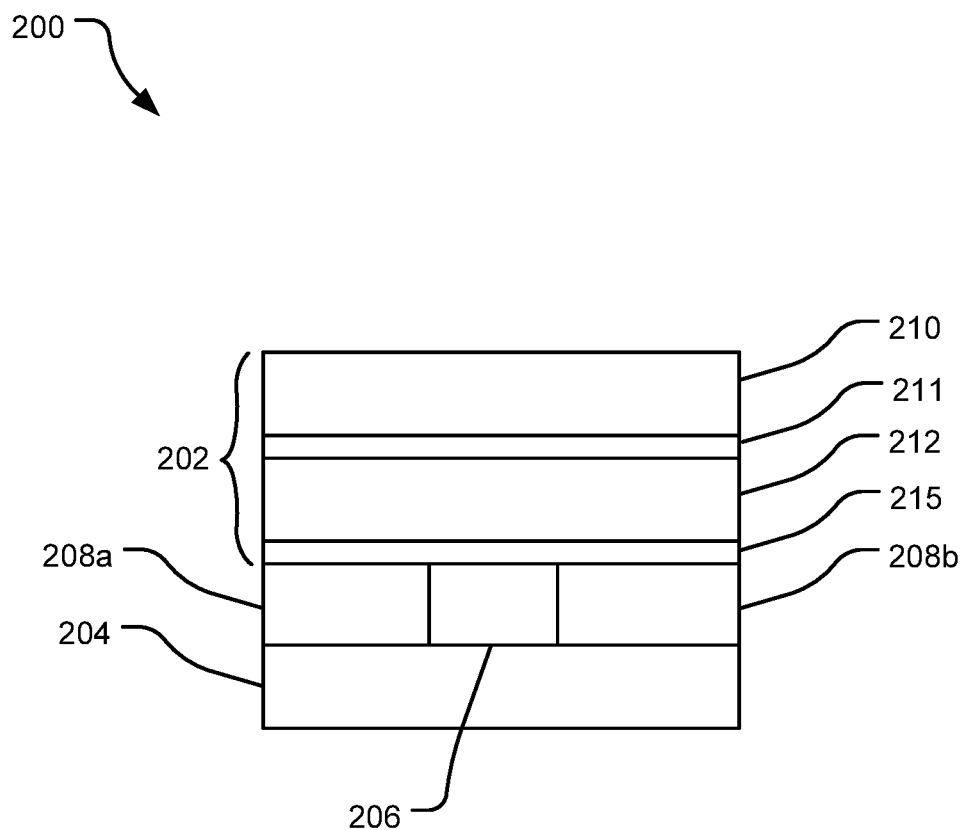
FIG. 2 is a schematic an air-bearing surface (ABS) view of an example reader sensor structure.

FIG. 2 illustrates an ABS view of an example implementation of a sensor structure, particularly, of a reader 200. The reader 200 includes a top shield 202 and a base or bottom shield 204 around a sensor stack 206 that has multiple layers, one of which is a free layer with a switchable magnetic orientation. The particulars of the sensor stack 206 are not detailed herein, and other layers that may be in the sensor stack 206 include an AFM layer, a pinned layer, a spacer layer, a reference layer, etc.

Also between the top shield 202 and the bottom shield 204, in the crosstrack or lateral direction to the sensor stack 206, are side shields 208. In the illustrated implementations, the side shields 208 encompass all layers of the sensor stack 206, however in other implementations, the side shields 208 may not encompass one or more of the layers that form the sensor stack 206. The side shields 208 may be hard magnetic or permanent magnets (PM), and may have high magnetic moment (i.e., greater than 1.0 T) or low magnetic moment (i.e., 1.0 T or less). The side shields 208 provide a magnetic biasing field on the free layer in the sensor stack 206. The side shields 208 can be directly magnetically coupled with the top shield 202.

The top shield 202 is a composite shield, composed of at least three layers; in this implementation, the top shield 202 has a pinned layer 210, a reference layer 212, a spacer 211 therebetween, and a high magnetic moment (HMM) layer 215 having a high magnetic moment. The pinned layer 210 is a magnetic layer that has a pinned (or not readily switchable) magnetic orientation, a low magnetic moment (i.e., 1.0 T or less) and low coercivity (usually on the order of a few Oersteads (Oe)), and low magnetic non-uniformity; the pinned layer 210 can be referred to as a low magnetic moment (LMM) layer. In some implementations, the reference layer 212 is a magnetic layer that also has a low magnetic moment of 1.0 T or less and a low coercivity and low magnetic non-uniformity. Together, in some implementations layers 210/211/212 are referred to as a synthetic antiferromagnetic layer, or SAF layer.

The HMM layer 215 is magnetically coupled to the reference layer 212 and is separated from the pinned layer 210 by the spacer layer 211 and by the reference layer 212. The HMM layer 215 is closer to the sensor stack 206 than the reference layer 212, and in the illustrated implementation, the HMM layer 215 is directly in contact with and adjacent to the sensor stack 206. In some implementations, the HMM layer 215 is not magnetically coupled to the stack 206. This can be due to a non-magnetic cap layer present between the stack 206 and the HMM layer 215. In some implementations, such a cap layer extends across the sensor stack 206 and the side shields 208, so that the side shields 208 contact the cap layer.

As indicated above, the HMM layer 215 is formed from a magnetic material having a magnetic moment greater than 1.0 T. In some implementations, the magnetic moment of the HMM layer 215 is at least 1.2 T, or at least 1.4 T, or at least 1.8 T, or even at least 2.4 T. General examples of high magnetic moment alloys include FeCo, FeCoN, FeSi, and FeC. Particular examples of high magnetic moment alloys include $Fe_{44-46}Co_{39-42}Ni_{14.5-15}$ (2.1 T), $Fe_{54-56}Ni_{27-29}Co_{16-18}$ (1.8 T), $Fe_{86-90}Cr_{10-14}$ (1.8 T), $Fe_{52-62}Co_{26-36}Cr_{10-14}$ (1.9 T), $Ni_{40-60}Fe_{50-60}$ including $Ni_{45}Fe_{55}$ (1.6 T), and "sendust" ($Al_{5.4}Fe_{65}Si_{9.6}$ (1.1 T)), where the subscripts indicate the range of atomic percentages for each element in the alloy. "Permalloy" ($Ni_{81}Fe_{19}$) is not a high magnetic moment material, as it has a magnetic moment of 1.0 T.

The HMM layer 215 may have a coercivity (e.g., a few tens of Oersteads) similar to or slightly higher than the coercivity of the pinned layer 210. The HMM layer 215 is sufficiently thin so that the SSS is increased slightly, if at all, over a comparable structure having no HMM layer. Because it is thin, its contribution to the total coercivity of the top shield 202 is relatively low. In some implementations, the HMM layer 215 has a thickness of at least 1 nm and in other implementations at least 2 nm. The HMM layer 215 is, in some implementations, no greater than 50 nm thick and in other implementations no greater than 30 nm. Example thicknesses of a discrete HMM layer, such as MEW layer 215, include 1 nm, 2 nm, 4 nm, 6 nm, 10 nm, 20 nm, and 30 nm.

The HMM layer 215 improves the PW50 of the reader 200 because the coercivity of the entire top shield 202 is the weighted average of the coercivity of the MEW layer 215 versus the rest of the top shield 202 (e.g., the pinned layer 210, the spacer layer 211 and the reference layer 212). The coercivity and magnetic non-uniformity of the shield 202 is increased minimally by the addition of the MEW layer 215, whereas the PW50 improves (i.e., decreases) significantly. The improved PW50 increases the capability of the sensor 200 to read data with higher linear density, thus allowing a recording device using the sensor 200 to provide higher linear data density and thus more cost effective data storage capabilities.

The particulars of the specific construction of the reader sensor 200 are not of particular relevance to composite shield and the MEW layer in the reader sensor 200, and a detailed discussion of the other elements of sensor 200 is not provided herein.

Figure 3:
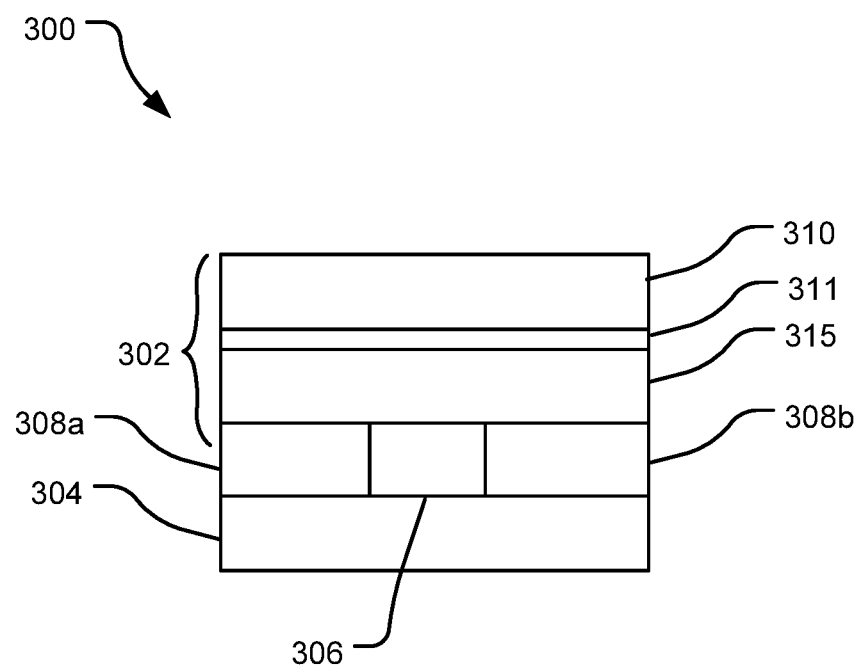
FIG. 3 is a schematic an air-bearing surface (ABS) view of an example reader sensor structure.

FIG. 3 illustrates another schematic block diagram of an ABS view of an example implementation of a reader 300. Various elements or features of reader 300 are the same as or similar to the corresponding element or feature of reader 200, unless indicated otherwise. The reader 300 includes a top shield 302 and a base or bottom shield 304 around a sensor stack 306. Also between the top shield 302 and the bottom shield 304, in the crosstrack or lateral direction to the sensor stack 306, are side shields 308.

Similar to the previous figure, the top shield 302 is a composite shield, composed of at least three layers; however in this implementation, the top shield 302 has a pinned layer 310, a spacer layer 311, and a reference layer 315 having a high magnetic moment. The composite HMM/reference layer 315 has a magnetic moment greater than 1.0 T, and is formed from a mixture or combination (e.g., an alloy) of a magnetic material having a magnetic moment greater than 1.0 T and a second magnetic material having a magnetic moment of 1.0 T or less. The ratio of the materials should be such that the resulting material has a magnetic moment greater than 1.0 T, in some implementations, at least 1.2 T, or at least 1.4 T, or at least 1.8 T, or even at least 2.4 T.

In other implementations, the HMM/reference layer 315 is a mixture or combination (e.g., an alloy) of multiple magnetic materials, at least one of which has a magnetic moment greater than 1.0 T. The pinned layer 310 is a low magnetic moment (LMM) layer, having a magnetic moment no greater than 1.0 T.

The HMM/reference layer 315 typically has a thickness similar to or equal to the thickness the reference layer would be if no HMM material were present. In some implementations, the HMM/reference layer 315 has a thickness of at least 5 nm, 10 nm, 20 nm and in other implementations at least 30 nm.

The HMM/reference layer 315 is separated from the pinned layer 310 by the spacer layer 311. The HMM/reference layer 315 is closer to the sensor stack 306 than the pinned layer 310, and in the illustrated implementation, the HMM/reference layer 315 is directly in contact with and adjacent to the sensor stack 306. The HMM/reference layer 315 is not magnetically coupled to the sensor stack 306.

Figure 4:
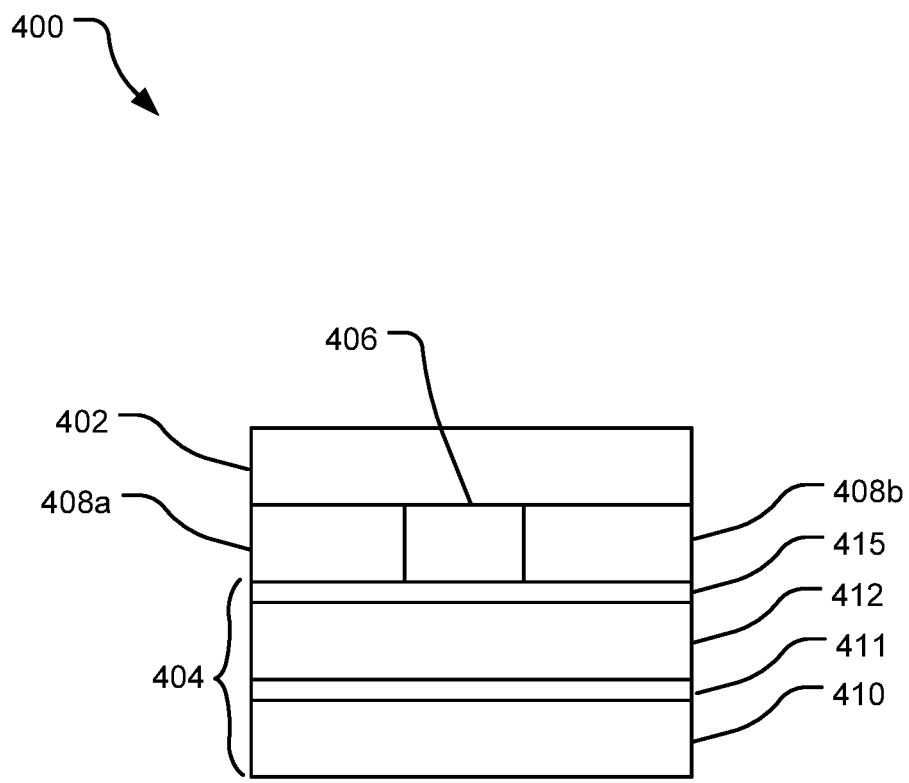
FIG. 4 is a schematic an air-bearing surface (ABS) view of an example reader sensor structure.

FIG. 4 illustrates another schematic block diagram of an ABS view of an example implementation of a reader 400. Various elements or features of reader 400 are the same as or similar to the corresponding element or feature of readers 200, 300, unless indicated otherwise. This reader 400 includes a top shield 402 and a base or bottom shield 404 around a sensor stack 406. Also between the top shield 402 and the bottom shield 404, in the crosstrack or lateral direction to the sensor stack 406, are side shields 408.

In this implementation, the bottom shield 404 is a composite shield, composed of at least three layers; in this implementation, the bottom shield 404 has a pinned layer 410, a reference layer 412, a spacer layer 411 therebetween, and a HMM layer 415 having a high magnetic moment. The HMM layer 415 has a magnetic moment greater than 1.0 T, whereas the pinned layer 410 has a low magnetic moment (LMM) no greater than 1.0 T.

The HMM layer 415 is magnetically coupled to the reference layer 412 and is separated from the pinned layer 410 by the spacer layer 411 and by the reference layer 412. The HMM layer 415 is closer to the sensor stack 406 than the pinned layer 410 and the reference layer 412, and in the illustrated implementation, the HMM layer 415 is directly in contact with and adjacent to the sensor stack 406.

Figure 5:
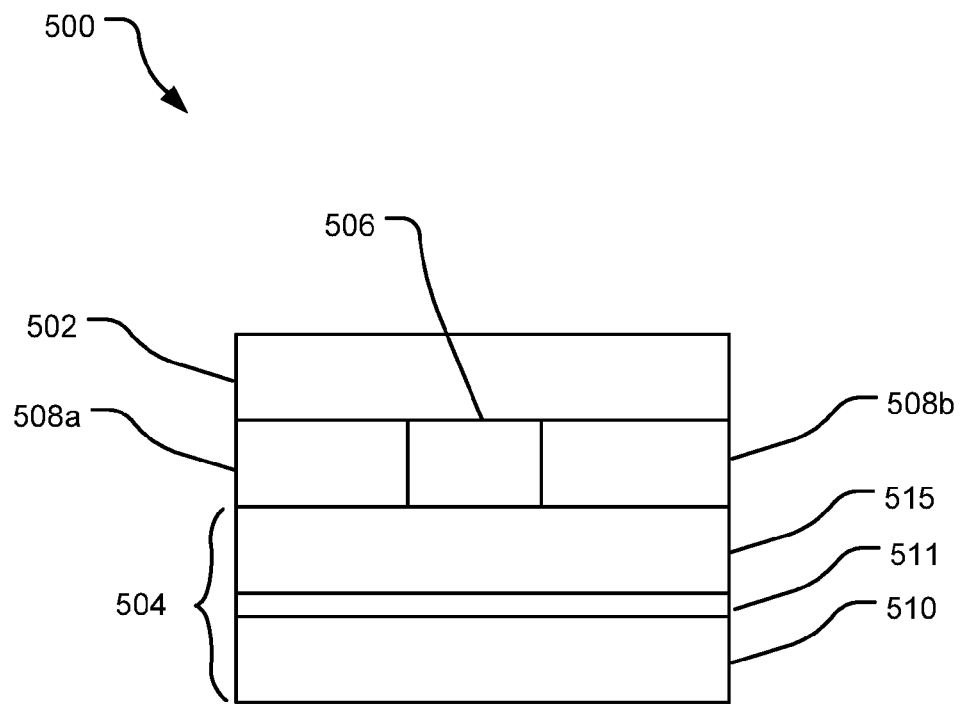
FIG. 5 is a schematic an air-bearing surface (ABS) view of an example reader sensor structure.

FIG. 5 illustrates another schematic block diagram of an ABS view of an example implementation of a reader 500. Various elements or features of reader 500 are the same as or similar to the corresponding element or feature of readers 200, 300, 400, unless indicated otherwise. The reader 500 includes a top shield 502 and a base or bottom shield 504 around a sensor stack 506. Also between the top shield 502 and the bottom shield 504, in the crosstrack or lateral direction to the sensor stack 506, are side shields 508.

Similar to the previous figure, the bottom shield 504 is a composite shield, composed of at least three layers; however in this implementation, the bottom shield 504 has a pinned layer 510, a spacer layer 511, and a reference layer 515 having a high magnetic moment. The HMM/reference layer 515 has a magnetic moment greater than 1.0 T, and is formed from a mixture or combination (e.g., an alloy) of multiple materials, at least one of which has a magnetic moment greater than 1.0 T. The pinned layer 510 is a low magnetic moment (LMM) layer, having a magnetic moment no greater than 1.0 T.

The HMM/reference layer 515 is separated from the pinned layer 510 by the spacer layer 511. The HMM/reference layer 515 is closer to the sensor stack 506 than the pinned layer 510, and in the illustrated implementation, the HMM/reference layer 515 is in direct contact with and adjacent to the sensor stack 506.

Figure 6:
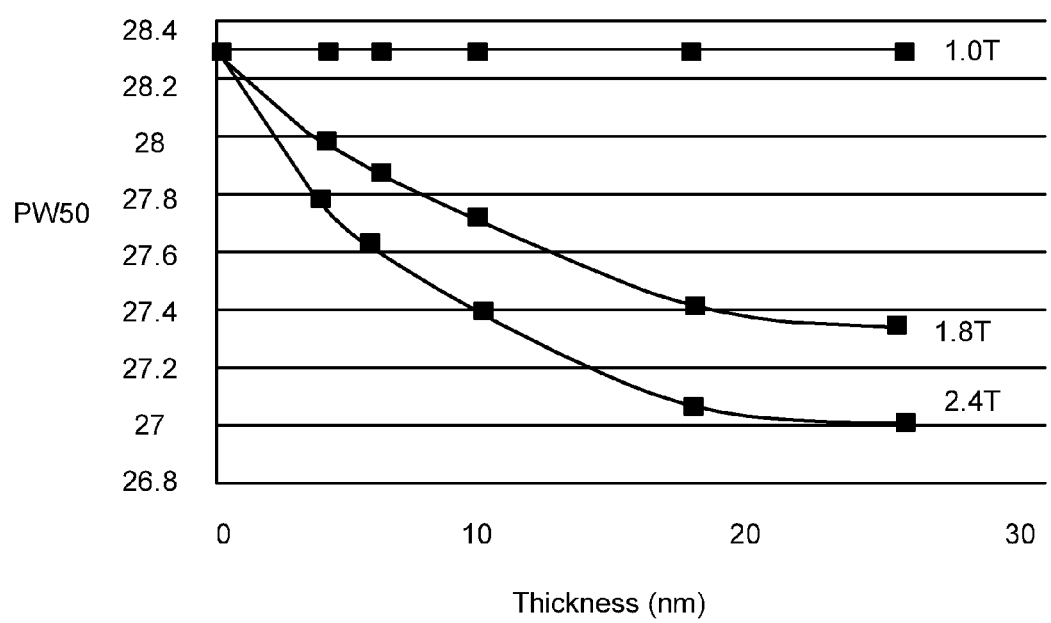
FIG. 6 is a graphical representation of the effect of the magnetic moment of a material and its thickness on PW50.

Various implementations of reader sensors were modeled, with a sensor stack having a 30 nm thick pinned layer and a reference layer and HMM layer that both varied in thickness. FIG. 6 shows the theoretical improvement (i.e., reduction) of PW50 due to the HMM material proximate to the sensor stack and directly magnetically coupled to the rest of the composite shield. The baseline sensor had a 30 nm reference layer with no HMM layer. The modeled sensor stacks were: 26 nm reference layer+4 nm HMM, 24 nm reference layer+6 nm HMM, 20 nm reference layer+10 nm HMM, 12 nm reference layer+18 nm HMM, and 4 nm reference layer+26 nm HMM. Two HMM materials were used for the models, a 1.8 T HMM and a 2.4 T HMM. As another baseline, a 1.0 T material was used.

As can be seen in FIG. 6, presence of the HMM layer reduces the PW50. The PW50 improves as the magnetic moment increased (i.e., 1.0 T versus 1.8 T versus 2.4 T). For example, a 10 nm HMM (1.8 T) improves the PW50 by 0.6 nm, and a 10 nm HMM (2.4 T) improves the PW50 by 0.9 nm. The PW50 also improves as the thickness of the HMM layer increases. For example, a 10 nm HMM (2.4 T) improves the PW50 by 0.9 nm and an 18 nm HMM (2.4 T) improves the PW50 by 1.2 nm. Decreased PW50 improves linear density capabilities of the reader.

Figure 7:
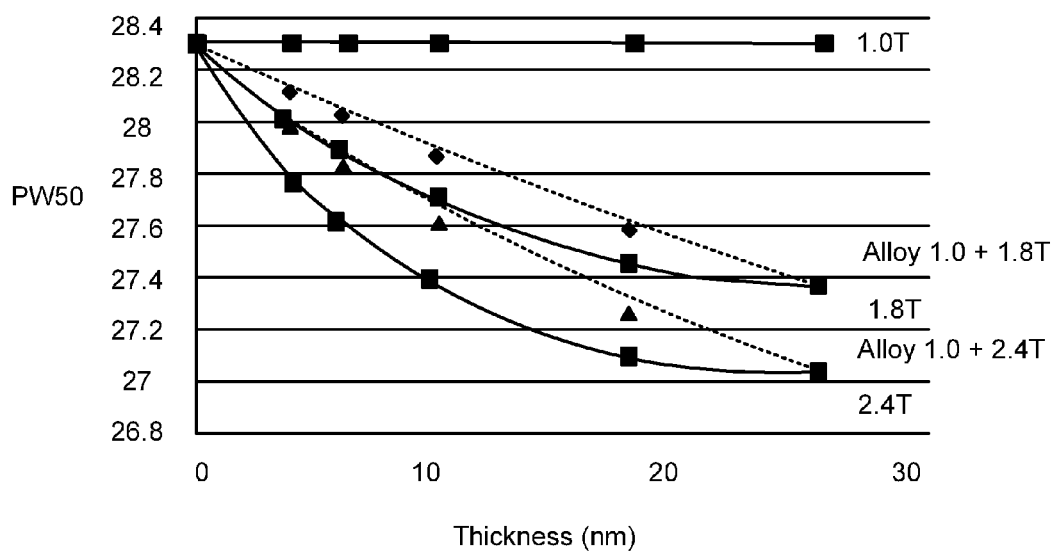
FIG. 7 is a graphical representation of the effect of the magnetic moment of a material, its thickness, and its inclusion with other materials on PW50.

Having the HMM alloyed with a lower magnetic moment material, as in the implementations shown and described in respect to FIGS. 3 and 5, also improves the PW50, although not as much as a discrete layer of HMM. As can be seen in FIG. 7, the PW50 decreases with both a discrete HMM layer or an HMM alloy layer, although the discrete HMM layer reduces PW50 more effectively.

A composite shield, either top shield or bottom shield, having a layer with a high magnetic moment greater than 1.0 T, improves PW50 while providing acceptable increase in coercivity and magnetic non-uniformity, all which enhances linear density capabilities of the reader.

All of the read sensors described above, readers 200, 300, 400, 500 and variations thereof, can be fabricated by conventional methods, including plating, deposition, etching, milling, and other conventional processing techniques.

Figure 8:
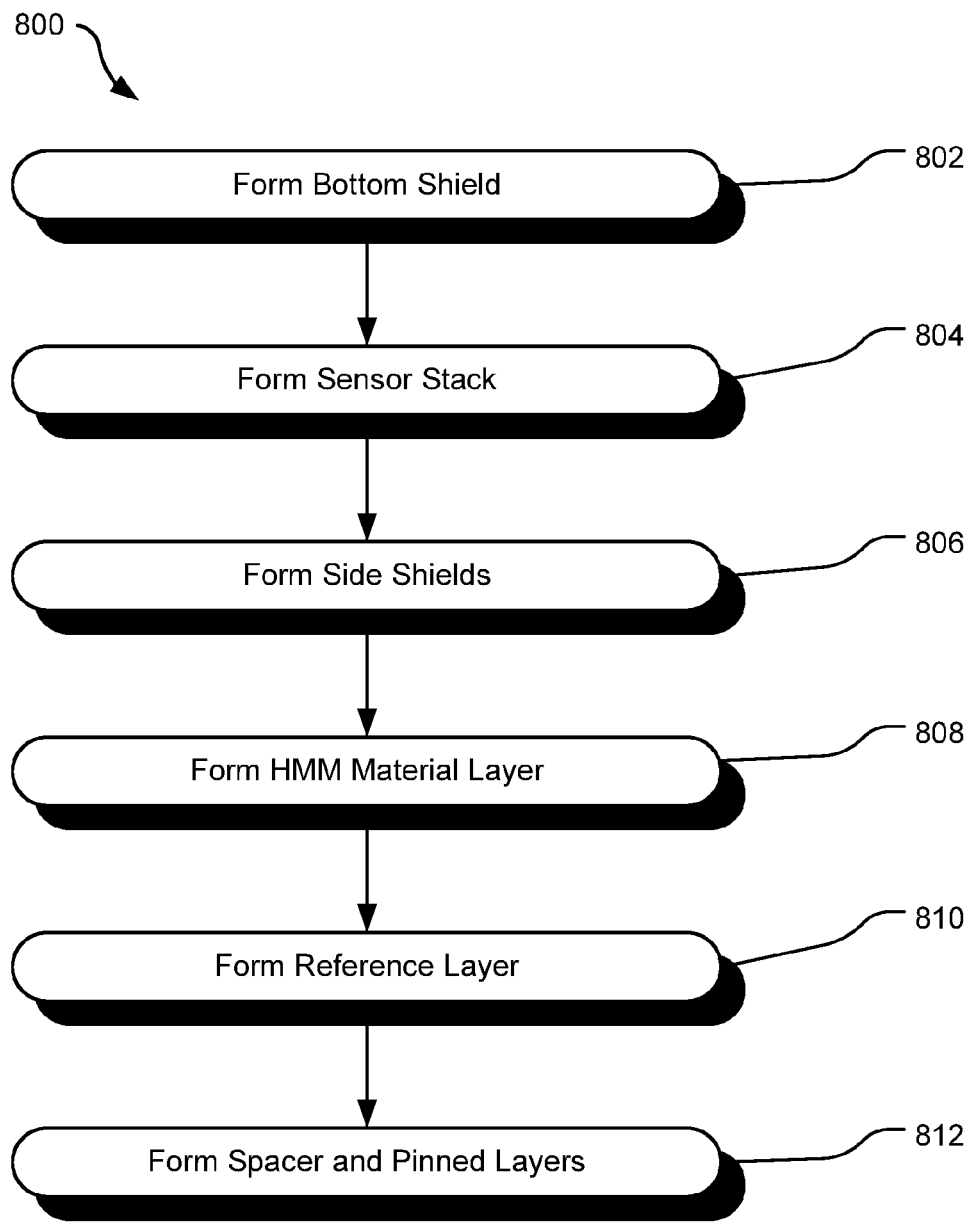
FIG. 8 is a flowchart illustrating an example method of forming an example reader sensor structure.

In reference now to FIG. 8, a flowchart illustrates an example method for forming a read sensor having a composite top shield with a discrete HMM layer, such as the sensor 200 of FIG. 2. The method involves operation 802 of forming a bottom shield layer on a substrate. This operation does not require forming the bottom shield directly on the substrate, as intervening materials/layers may be present between the bottom shield and substrate. A sensor stack is formed on the bottom shield in operation 804. This operation does not require forming the sensor stack directly on the substrate, as intervening materials/layers may be present between the bottom shield and sensor stack. In operation 806, side shields are formed on the bottom shield around the sensor stack. A composite top shield is formed on the sensor stack in operations 808 through 812. In operation 808, a layer of HMM material (i.e., having a magnetic moment of greater than 1.0 T) is formed. In this particular method, the HMM layer is formed directly on and in contact with the sensor stack. In operation 810, a reference layer is formed, in this particular method, on and in contact with the MINI layer. A spacer layer and then a pinned layer are formed in operation 812 on the reference layer.

Figure 9:
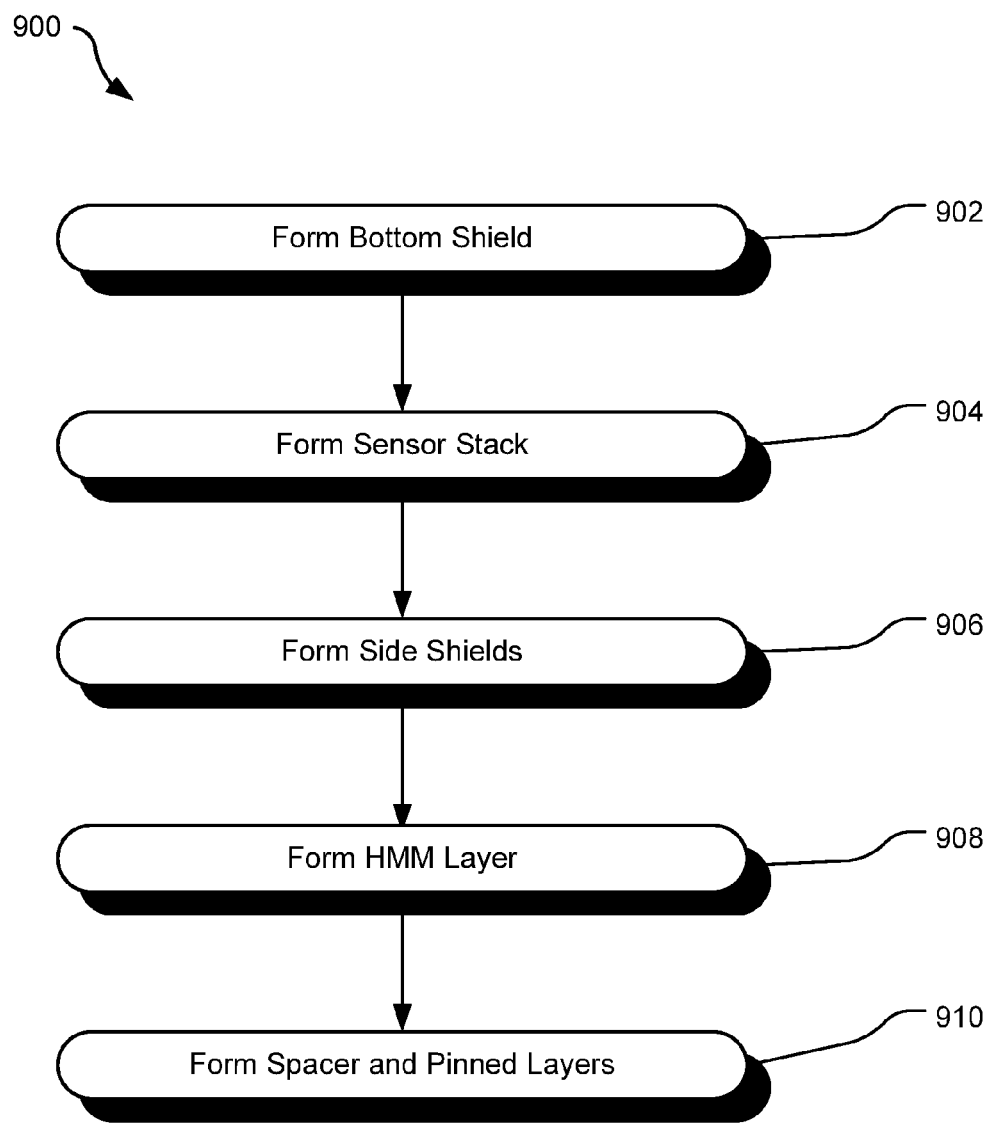
FIG. 9 is a flowchart illustrating an example method of forming an example reader sensor structure.

An alternate example method for forming a read sensor is illustrated in FIG. 9, the read sensor having a composite top shield with an alloy HMM layer, such as the sensor 300 of FIG. 3. The method involves operation 902 of forming a bottom shield layer on a substrate. This operation does not require forming the bottom shield directly on the substrate, as intervening materials/layers may be present between the bottom shield and substrate. A sensor stack is formed on the bottom shield in operation 904. This operation does not require forming the sensor stack directly on the substrate, as intervening materials/layers may be present between the bottom shield and sensor stack. In operation 906, side shields are formed on the bottom shield around the sensor stack. A composite top shield is formed on the sensor stack in operations 908 through 910. In operation 908, a HMM layer (i.e., having a magnetic moment of greater than 1.0 T) is formed; the HMM layer is composed of multiple magnetic materials, at least one of which has a magnetic moment greater than 1.0 T. In this particular method, the HMM layer is formed directly on and in contact with the sensor stack. In operation 910, a spacer layer and then a pinned layer are formed on the reference layer.

The above specification and examples provide a complete description of the structure and use of exemplary implementations of the invention. The above description provides specific implementations. It is to be understood that other implementations are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above", "on top", "on," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A reader sensor comprising:
   a sensor stack; and
   a composite shield including:
     a reference layer having a magnetic moment greater than 1.0 T, the reference layer comprising a first magnetic material having a magnetic moment greater than 1.0 T and a second magnetic material having a magnetic moment of 1.0 T or less,
     a pinned layer having a magnetic moment no greater 1.0 T, and
     a spacer between the reference layer and the pinned layer,
   wherein the reference layer is in contact with and adjacent to the sensor stack.

2. The reader sensor of claim 1, wherein the composite shield is a top shield.

3. The reader sensor of claim 1, wherein the composite shield is a bottom shield.

4. The reader sensor of claim 1, wherein the reference layer comprises an alloy of the first magnetic material and the second magnetic material.

5. The reader sensor of claim 1, wherein the reference layer comprises a mixture of the first magnetic material and the second magnetic material.

6. The reader sensor of claim 1, wherein the reference layer has a thickness of at least 10 nm.

7. The reader sensor of claim 1, wherein the reference layer has a thickness of at least 20 nm.

8. The reader sensor of claim 1, wherein the reference layer has a magnetic moment of at least 1.2 T.

9. The reader sensor of claim 1, wherein the first magnetic material has a magnetic moment of at least 1.2 T.

10. The reader sensor of claim 1, wherein the first magnetic material has a magnetic moment of at least 1.4 T.

11. A reader sensor comprising:
    a top shield;
    a bottom shield; and
    a sensor stack between the top shield and the bottom shield;
    wherein one of the top shield or the bottom shield comprises:
      a reference layer having a magnetic moment greater than 1.0 T, the reference layer comprising a first magnetic material having a magnetic moment greater than 1.0 T and a second magnetic material having a magnetic moment of 1.0 T or less,
      a pinned layer having a magnetic moment no greater 1.0 T, and
      a spacer between the reference layer and the pinned layer,
    wherein the reference layer is closer to the sensor stack than is the pinned layer.

12. The reader sensor to claim 11, wherein the reference layer is in contact with and adjacent to the sensor stack.

13. The reader sensor of claim 11, wherein the reference layer comprises an alloy of the first magnetic material and the second magnetic material.

14. The reader sensor of claim 11, wherein the reference layer comprises a mixture of the first magnetic material and the second magnetic material.

15. The reader sensor of claim 11, wherein the reference layer has a thickness of at least 10 nm.

16. The reader sensor of claim 11, wherein the reference layer has a magnetic moment of at least 1.2 T.

17. The reader sensor of claim 11, wherein the first magnetic material has a magnetic moment of at least 1.2 T.

18. The reader sensor of claim 11, wherein the first magnetic material has a magnetic moment of at least 1.4 T.

* * * * *